United States Patent

Lee et al.

[11] Patent Number: 5,912,309
[45] Date of Patent: Jun. 15, 1999

[54] GAS PHASE FLUIDIZED BED POLYMERIZATION PROCESS USING SONIC CLEANER WITH OPTIMUM DESIGN AND OPERATION

[75] Inventors: Kiu Hee Lee, South Charleston; Ping Cai, Hurricane; Roger Brady Painter, Scott Depot, all of W. Va.; William Jene Price, Victoria, Tex.; David Merrill Rebhan, Alum Creek, W. Va.

[73] Assignee: Union Carbide Chemicals & Plastics Technology Corporation, Danbury, Conn.

[21] Appl. No.: 08/893,953
[22] Filed: Jul. 16, 1997
[51] Int. Cl.[6] .................................................. C08F 2/34
[52] U.S. Cl. .............................. 526/74; 526/88; 526/901; 526/335; 526/341; 526/346
[58] Field of Search .................................. 526/74, 88, 901

[56] References Cited

U.S. PATENT DOCUMENTS 5,461,123  10/1995  Song et al. ................................ 526/74

Primary Examiner—David W. Wu
Attorney, Agent, or Firm—B. L. Deppenbrock

[57] ABSTRACT

A improved process is provided for polymerization of olefin and/or diolefin polymer, using sonic cleaning devices, with optimum design and operation, to eliminate or reduce reactor fouling and/or sheeting.

12 Claims, 2 Drawing Sheets

GAS PHASE FLUIDIZED BED POLYMERIZATION PROCESS USING SONIC CLEANER WITH OPTIMUM DESIGN AND OPERATION

FIELD OF THE INVENTION

This invention relates to the polymerization of olefin and/or diolefin polymers. More particularly, the invention relates to the use of one or more sonic cleaning devices to eliminate or reduce fouling and/or sheeting during polymerization of these polymers.

BACKGROUND OF THE INVENTION

One of the most economic and commonly used methods to manufacture polymers is gas phase polymerization. A conventional gas phase fluidized bed reactor used in polymerizing olefins and/or diolefins contains a fluidized dense-phase bed (i.e., the mixture of reaction gas and polymer (resin) particles) and a freeboard above the dense-phase surface (bed level). The freeboard contains mainly gas and a small amount of particles, especially the fine particles (fines). The dense-phase bed is usually maintained in a cylindrical straight section of the reactor. Above the straight section, there is a section having a larger diameter, the so called expanded section, to reduce the gas velocity for the purpose of reducing the amount of fines carried out of the reactor to other parts of the reaction system. The expanded section connects with the straight section by its tapered conical section. The freeboard is usually located at the expanded section. If the bed level is lower than the top of the straight section, the upper portion of the straight section also becomes a part of the freeboard.

During reactor operation, fines present in the freeboard will either be carried away by the gas leaving the reactor or fall back into the dense-phase. However, some fines may attach onto the interior wall of the reactor system, particularly in the freeboard portion, and accumulate to form so-called sheets, i.e., layers of agglomerated, melted or half-melted, resin and catalyst particles. Sheets can adversely affect properties of the polymer product. When sheets become heavy, they can fall off the walls and plug the product discharge system or clog the distributor plate. Small pieces of sheets can be discharged together with the bulk resin particles and contribute to product quality problems by increasing the gel level of end-use products such as plastic containers and films. Sheeting and fines accumulation are collectively referred to as solid particle build-up.

Conventionally, to prevent sheeting from affecting these and other parts of the reaction system, as well as the final polymer product, the reactors are shutdown periodically and the walls are cleaned. When a reactor is down for cleaning, large amounts of operation time are lost, in addition to the cost of the cleaning itself. Thus, a method to continuously clean the interior wall in the reactor freeboard and other parts of the reaction system can provide savings of time and money.

In U.S. Pat. No. 5,461,123, the reactor wall is protected from particle build-up by sound waves. According to that invention, sound waves are introduced into the reactor to loosen particles attached on the wall. Then the loosened particles can be carried away from the wall by gravity or drag forces.

However, it has been discovered that the performance of the sound waves relies on several parameters, e.g., number of sonic nozzles, location of sonic nozzles, orientation of sonic nozzles, sound pressure level, sound wave frequency, sonic operation mode (including duration and interval), length of sonic tubes, diameter of sonic tubes, sonic tube insertion length, etc. The proper selection of these design and operating parameters is necessary to achieve optimal protection of the reactor freeboard, otherwise the effectiveness of the sound waves can be diminished or even eliminated.

It will be desirable to provide an improved gas phase polyolefin polymerization process using sonic devices with optimum design and operation. It is the object of this invention to provide methods to optimize the design and operation of the sonic cleaning device(s).

SUMMARY OF THE INVENTION

Accordingly there is provided a process for polymerizing (a) at least one alpha olefin and optionally a diene or (b) one or more diolefins, which process comprises: polymerizing in the presence of at least one polymerization catalyst in a gas phase reactor equipped with at least 1 sound wave producing device in which each device (1) emits sound waves ranging from about 5 Hz to 40 Hz; (2) has a standard sound pressure level ranging from about 100 dB to 200 dB; (3) achieves a minimum sound pressure level on the interior surface of the reactor to be protected ranging from about 100 dB to 200 dB; and (4) wherein the sound waves are introduced in the reactor system via one or more sonic nozzles positioned such that each sonic nozzle has an elevation within about ±60%. of the value and an azimuth within ±60° of the value, calculated by the surface integration equation:

$$\oiint_{\text{surface to be protected}} W_f SPL\, dS = \text{maximum} \tag{1}$$

where $W_f$ is the weighting function ranging from about 1.0 to 5.0 for different parts of the interior surfaces of the reactor; SPL is the sound pressure level; dS is the surface element of the surface integration. Solid particle build-up on the interior surfaces of the reactor system can be prevented or removed by sound waves.

BRIEF DESCRIPTION OF THE DRAWING

In FIG. 1, the reactor (1) includes a distributor plate (2), a straight section (3), mainly used to hold the dense-phase bed (4) or a part of the dense phase bed, a tapered-conical expanded section (5) and a semi-spherical dome (6). The space above the dense-phase bed surface (7) is the freeboard (8). The dimensions of the reactors of the Examples are: D=14.5 ft, $D_e$=23 ft, $H_1$=50 ft, $H_2$=20.4 ft.

In FIG. 2, 1=pulsation generation unit; 2=sonic tube; 3=exterior wall of the reactor; 4=interior wall of the reactor; and 5=sonic nozzle.

DETAILED DESCRIPTION OF THE INVENTION

Figure 1:
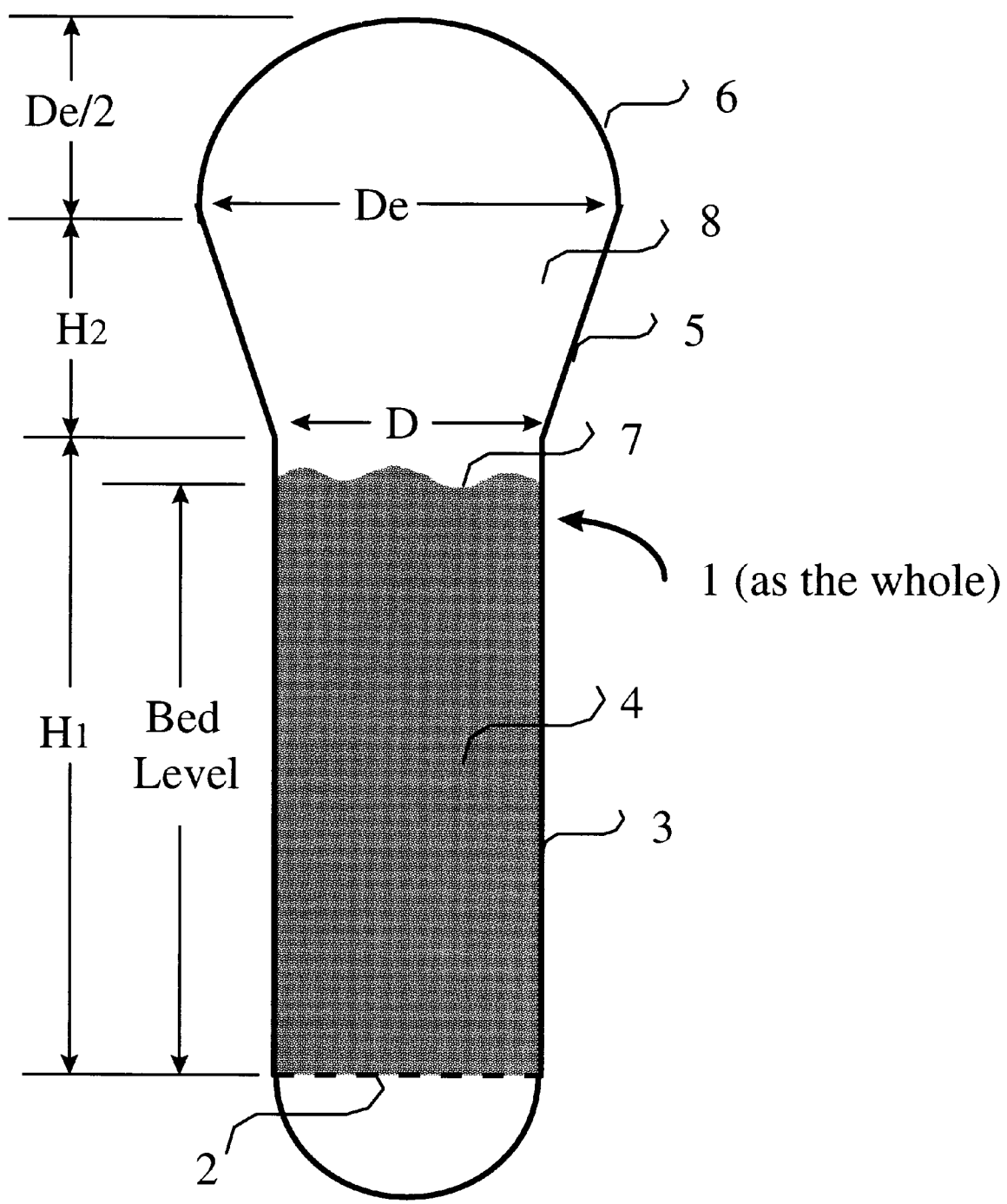
FIG. 1 is a depiction of a typical gas phase fluidized bed reactor used in the Examples.
Figure 2:
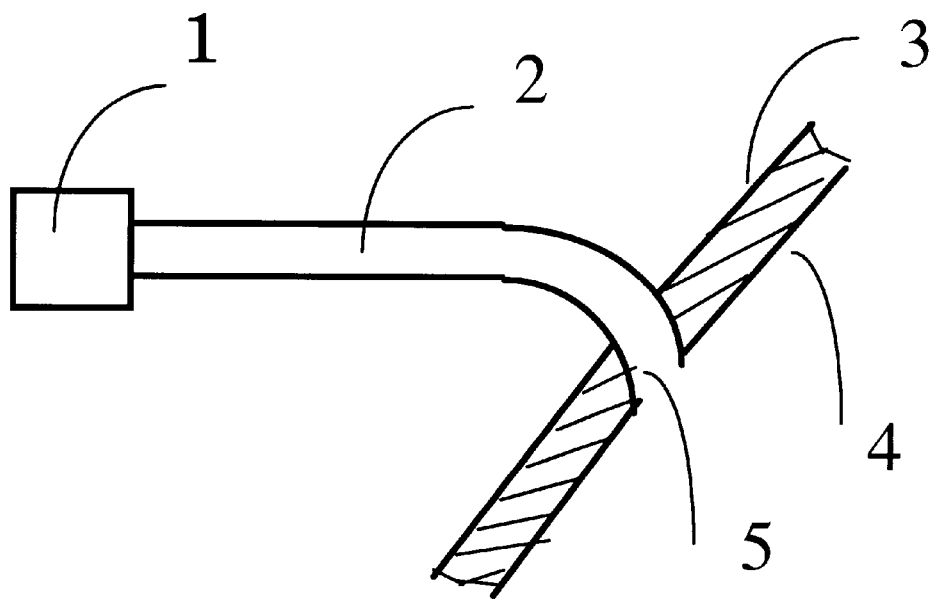
FIG. 2 is a schematic of a sound wave producing device and its interfaces with a reactor wall.

Polymers and Monomers. Illustrative of the polymers which can be produced in accordance with the process of the invention are the following: homopolymers and copolymers of $C_2$–$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$–$C_{18}$ alpha olefin; terpolymers of one or more $C_2$–$C_{18}$ alpha olefins with a diene; and the like.

Monomers that can be employed in the process can include one or more: $C_2$–$C_{18}$ alpha olefins such as ethylene, propylene, and optionally at least one diene (such as those taught in U.S. Pat. No. 5,317,036 to Brady et al.), for example, hexadiene, dicyclopentadiene, octadiene including methyloctadiene (e.g., 1-methyl-1,6-octadiene and 7-methyl-1,6-octadiene), norbornadiene, and ethylidene norbornene; readily condensable monomers such as those taught in U.S. Pat. No. 5,453,471 including isoprene, styrene, butadiene, isobutylene, chloroprene, acrylonitrile, cyclic olefins such as norbornenes, and the like.

Polymerization Process. The process of the present invention can be used in conjunction with slurry, solution, bulk, stirred bed and fluidized bed polymerizations. The interior surfaces above the dense-phase (including gas-solid dense phase, slurry phase, or solution phase) level in any one of those reactors can be protected by sound wave producing device(s) of this invention to prevent particle accumulation. Even the surfaces under the dense-phase level can also be partially or completely protected, especially when liquid exists in the dense phase.

Preferably, the present invention is employed in fluidized bed polymerizations (that is mechanically stirred and/or gas fluidized), with those utilizing a gas phase being most preferred. The present invention is not limited to any specific type of fluidized or gas phase polymerization reaction and can be carried out in a single reactor or multiple reactors such as two or more reactors in series. In addition to well-known conventional gas phase polymerization processes, "condensing mode", including the so-called "induced condensing mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534.

Condensing mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced. It may also include monomers and comonomers. The condensing fluid can be introduced into the reaction/recycle system at any point in the system. Condensable fluids include saturated or unsaturated hydrocarbons.

In addition to condensable fluids of the polymerization process itself, other condensable fluids inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly.

Liquid monomer polymerization mode is disclosed, in U.S. Pat. No. 5,453,471; U.S. Ser. No. 08/510,375 (pending); PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or inert particulate material (e.g., carbon black, silica, clay, talc, and mixtures thereof) present in the bed, so long as there is no substantial amount of free liquid monomer present. Liquid monomer mode makes it possible to produce polymers in a gas phase reactor using monomers having condensation temperatures much higher than the temperatures at which conventional polyolefins are produced. In general, a liquid monomer mode process is conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; continuously withdrawing unreacted gases from the zone; and compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

Typically, the fluidized bed polymerization process is conducted at a pressure ranging from about 10 to 1000 psi, preferably about 200 to about 600 psi and a temperature ranging from about 10° C. to about 150° C., preferably about 40° C. to about 125° C. During the polymerization process the superficial gas velocity ranges from about 0.7 to 3.5 feet/second, and preferably about 1.0 to 2.7 feet/second.

Catalysts. Any type of polymerization catalyst may be used in the polymerization process of the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include:

A. Ziegler-Natta catalysts, including titanium based catalysts such as those described in U.S. Pat. Nos. 4,376,062 and 4,379,758. Ziegler-Natta catalysts are well known in the art, and typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Metallocene catalysts and other single-site or single-site-like catalysts such as those taught in U.S. Pat. Nos. 4,530,914; 4,665,047; 4,752,597; 5,218,071; 5,272,236; 5,278,272; 5,317,036; and 5,527,752.

E. Cationic forms of metal halides, such as aluminum trihalides.

F. Anionic Initiators such as butyl lithiums.

G. Cobalt catalysts and mixtures thereof such as those described in U.S. Pat. Nos. 4,472,559 and 4,182,814.

H. Nickel catalysts and mixtures thereof such as those described in U.S. Pat. Nos. 4,155,880 and 4,102,817.

I. Rare earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium bichloride), and allyl derivatives of such metals, e.g., of neodymium. Neodymium compounds, particularly neodymium neodecanoate, octanoate, and versatate, and n-alkyl neodymium are the most preferred rare earth metal catalysts. Rare earth catalysts are especially preferred and used to produce polymers polymerized using butadiene, styrene, or isoprene and the like.

Preferred catalysts for the process of the present invention include rare earth metal catalysts, titanium catalysts, chromium catalysts, nickel catalysts, vanadium catalysts, and metallocene/single-site/single-site-like catalysts.

Inert Particulate Materials. The polymerization process of the present invention can include other additives such as inert particulate particles. Inert particulate particles can include, for example, carbon black, silica, clay, and talc used in some processes which produce sticky polymers such as in accordance with U.S. Pat. No. 4,994,534 and polymers from readily condensable monomers enumerated previously herein. The use of inert particulate materials is especially preferred in gas phase polymerization employing a diene as one of the monomers or when a diolefin is the sole monomer present. Of the inert particulate materials, carbon black, silica, and a mixture thereof are preferred, with carbon black being most preferred. The inert particulate material is employed in the gas-phase polymerization in an amount ranging from about 0.3 to about 80 weight percent, preferably about 5 to about 75 weight percent, most preferably 5 to 50 weight percent based on the weight of the final polymer product.

Sonic Waves and Sound Wave Producing Devices. In the present invention, sound waves are generated by one or more sound wave producing devices also referred to herein as sonic cleaners). The sound wave producing device includes at least one pulsation generation unit, at least one sonic tube connected with the pulsation generation unit to generate and propagate sound waves at a desired frequency, and at least one sonic nozzle at the end of the sonic tube to introduce the sound waves into the reactor. The pulsation generation unit typically includes one or more chambers containing at least one piston moving back-and-forth in the same frequency as the sonic frequency, with the piston(s) driven by gas, electric, or other means. Pulsation generation units are available from and can be designed by Kockum-Sonics AB (Sweden). The sound waves are introduced into the reactor system via sonic nozzles at various locations for the purpose of keeping the wall surfaces free of solid particle build-up. Suitable locations include the reactor freeboard, heat exchanger(s), recycle line, below the distributor plate, purge bin, and/or bag house.

In order to achieve the desired performance of the sonic cleaner(s), it is necessary to select many design and operating parameters and determine their optimum ranges. Those parameters, with their optimum ranges or configurations detailed in this invention, include (1) standard sound pressure level of the sound producing device, (2) minimum sound pressure level on the entire surface to be cleaned, (3) sound wave frequency, (4) sonic tube lengths, (5) sound wave duration and interval, (6) number of sonic nozzles, (7) locations and orientations of sonic nozzles, (8) insertion lengths and diameters of sonic tubes, and (9) sonic tube configurations. The sound wave frequency of this invention covers both the audible and non-audible ranges.

Sound Pressure Level. The sound energy introduced by the sound wave producing device(s) has to be able to dislodge polymer particles, fines, sheets or other particles from the inside surfaces of the reactor system. A parameter called Standard Sound Pressure Level (SSPL) is used herein to measure the energy level of a sound wave producing device. SSPL is defined as the Sound Pressure Level (SPL) measured at 1 meter away from a sound source (e.g., sonic nozzle) in the absence of obvious interference contributed by the reflected sound waves. The SSPL of the sound wave producing device employed in the present invention is preferably from about 100 to 200 decibels (dB), and most preferably from about 140 dB to 170 dB.

Minimum Sound Pressure Level. The interior surface of the reactor system to be cleaned, e.g., the surface in the reactor freeboard section, can be protected by the sound waves with sufficient energy to prevent particle accumulation. The SPLs at different locations of the surface to be cleaned are usually different due to different distances from the sonic nozzle(s), etc. Thus, the minimum Sound Pressure Level (mSPL) on the entire surface to be cleaned is an index to measure the effectiveness of the sound waves in preventing solid particle build-up. In the present invention, the minimum SPL on the entire surface to be cleaned in the reactor system is preferably from about 100 dB to 200 dB, and most preferably from about 120 dB to 170 dB.

Sound Wave Frequency. Sound waves employed in the present invention are of a frequency suitable to dislodge polymer particles, fines, sheets or other particles from the interior surfaces of the reactor system. When the frequency is too high, the particles attached on the reactor wall would be difficult to loosen. When, the frequency is too low, the sonic tube used to generate the sound wave would be long such that there is a measurable sound energy loss. The sound wave frequency used in the present invention can vary from the non-audible infrasonic wave range (with a typical sound frequency lower than 20 Hertz (Hz)) to the audible sonic wave range (with a typical sound frequency higher than 20 Hz). The frequency is preferably from about 5 to 40 Hz, and most preferably from about 10 to 25 Hz.

Sonic Tube Length and Diameter. The length and diameter of the sonic tube ensure that sufficient sound energy will be delivered into the reactor. Preferably the sonic tube length ranges from about $\frac{1}{8}$ to $\frac{3}{8}$ times the sound wave length, most preferably from about $\frac{3}{16}$ to $\frac{5}{16}$ times the sound wave length. If the sonic tube diameter is too small, a part of the sound energy will be consumed within the sonic tube due to wall reflection. If the sonic tube diameter is too large, manufacturing and operating difficulties could be encountered. The sonic tube inner diameter employed in the present invention is preferably from about 2 to 12 inches, and most preferably from about 3 to 10 inches.

Sound Wave Duration and Interval. Duration and interval of the sound waves are indexes to determine sonic cleaner performance. Duration is the period of time that the device is producing sound waves, and interval is the period of time between two adjacent activations of the sonic device. A long interval may result in severe solid particle build-up on the reactor wall and cause difficulties in cleaning the wall by sound waves. A short duration may not achieve sufficient cleaning effect. In the present invention, the preferred interval of the sonic cleaner is from about zero (i.e., continuous operation) to 4 hours, most preferably from about 3 minutes to 1 hour. The optimum duration employed in the present invention is preferably from about 5 seconds to continuous operation, most preferably from about 10 to 60 seconds.

Number of Sonic Nozzles. The optimal number of sonic nozzles depends on the total volume of the area being cleaned. For example, in the reactor freeboard, the ratio of freeboard volume, in cubic feet, to nozzle number used in the present invention is preferably less than about 7,000:1, and most preferably less than about 5,000:1. For conventional commercial reactors 1 to 10 sound wave producing devices can be introduced into a reactor system in different locations including freeboard portion of a reactor, heat exchanger(s), recycle line, below a distributor plate, purge bin, and bag house.

Nozzle Location and Orientation. Optimum sonic nozzle locations ensure the best distribution of sound wave energy on the interior surface to be affected or protected. Mathematically, the optimum locations can be determined by the following surface integration equation $$\oiint_{\text{surface to be protected}} W_f SPL \, dS = \text{maximum} \quad (1)$$

where SPL is the sound pressure level, dS is the surface element of the surface integration, and $W_f$ is the weighting function that determines the relative importance of each specific surface to be covered. It is to be understood that surfaces concealed by or hidden beneath the bed are not well protected by sound waves since the bed absorbs or dissipates the waves after they penetrate a few feet into the bed. Generally, for areas prone to build-up, $W_f$ can be selected between about 1.5 and 5, while the other areas $W_f$ can be chosen between about 1.0 and 1.5. In the present invention, the elevation of each sonic nozzle is preferably within about ±60% of the value calculated by Eq.(1), and most preferably within about ±40%. The azimuth of each nozzle is preferably within about ±60° of the value calculated by Eq.(1), and most preferably within about ±30°.

After the optimum nozzle locations are defined, the sonic nozzle orientations determine whether the entire surface to be cleaned is covered by direct sonic wave propagation. If an area is not covered by the direct propagation, the majority of the sound waves reaching that area is comprised by reflection waves. Reflection waves could have a higher sound wave frequency due to the superposition effect and are not effective for surface cleaning. The present invention discloses that the surfaces most effectively cleaned by sound waves are within a cone-shaped volume, with the conical node at the sonic nozzle. In a preferred embodiment of the present invention, the orientations of the sonic nozzles ensure that the surface to be cleaned is covered by at least one cone-shaped volume with the conical node at a sonic nozzle and the conical angle smaller than about 270°. Most preferably that conical angle is smaller than about 180°.

Sonic Tube Insertion into Reactor. If a sonic tube is inserted into the reactor, its exterior surface may become the location for the potential solid build-up, and might even disturb the performance of the sonic cleaner by the additional reflection effect. The optimum insertion length of the sonic tube(s) employed in the present invention is preferably from about 0 (flush with interior reactor surface) to 6 feet, and most preferably from about 0 to 2 feet.

Sonic Tube Configuration. Configuration of the sonic tube aids in maintaining an efficient and safe operation. If there are many bends (or elbows) in the sonic tube, sound wave loss and undesirable levels of piping vibration could be encountered. In the present invention, the number of bends in a single sonic tube is no more than about 6, preferably no more than about 3, and most preferably no more than about 3 long-radius bends and no short-radius bend.

All patents mentioned in the specification are hereby incorporated by reference.

The following examples further illustrate the present invention.

EXAMPLES

All the following examples are related to the commercial scale operations conducted in two gas phase fluidized bed polymerization reactors with the same geometric dimensions as seen in FIG. 1. Detailed operating conditions and results of these examples are listed in Tables 1, 2 and 3.

Examples 1 through 9 demonstrate the effect of the sound waves on the removal of solid particle build-up from the interior wall of a gas phase fluidized bed reactor for polyethylene manufacturing. The effect on the product gel level is also illustrated by these examples. Examples 10 through 12 demonstrate the application of sound waves in a gas phase fluidized bed reactor for producing ethylene/propylene/diene rubber. Reactors are opened after each test (about 1 to 3 months of operation) for the solid particle build-up inspection. For the polyethylene reactor, the product gel level is measured every 4 to 6 hours. The average gel level data are listed in Table 1.

Example 1 (comparative) was a polymerization conducted in the absence of a sonic cleaner. After a period of operation, about a 1-inch thick layer of built-up resin particles/layers were found on most parts of the reactor freeboard surface. The product gel level was significant.

Example 2 (Best Mode) is a polymerization as in Example 1, except 4 sound wave producing devices are installed to introduce the desired sound wave(s) into the reactor freeboard. All the design and operating parameters are selected within the optimum ranges. The optimization results in clean interior surfaces of the reactor freeboard (no particle build-up) and excellent product quality (no gels).

Example 3 (comparative) is designed to demonstrate the influence of sonic tube length. All the design and operating parameters are identical to those of Example 2, except the sonic tube length is changed to 7/16 of the wave length. The improper tube length causes a very weak SSPL. Compared with Example 1 (no sonic cleaner), the effectiveness in removing particle build-up and improving product quality is not significant because a very weak output of the sound wave energy.

Example 4 (comparative) is designed to check the effect of sonic tube diameter. All the design and operating parameters were identical to those of Example 2, except the sonic tube diameter was reduced to 1.5 inch (much smaller than that of Example 2). The results indicate that a very weak SSPL is achieved. Compared with Example 1 (no sonic cleaner), the effectiveness in removing particle build-up and improving product quality is not significant because most of the sound energy is consumed by the "wall reflection" within the sonic tube.

Example 5 (comparative) is designed to test the function of sound wave duration. All the design and operating parameters are identical to those of Example 2, except the sound wave duration is 5 seconds. Open reactor inspection showed that the solid particle buildup is found on most of the freeboard surfaces, but the thickness of the build-up is thinner (about ¼ to ½ inch) than that observed in Example 1. Product quality is also slightly improved. That means the 5 second sound wave duration does not fully take advantage of the sonic cleaner. In such a short activation period, the particle attachment has not been sufficiently shaken to be loosened by sound waves.

Example 6 (comparative) is designed to explore the effect of sound wave interval. All the design and operating parameters are identical to those of Example 2, except the interval is prolonged to 65 minutes. During such a long interval, the accumulation of particle build-up can become quite severe and it is difficult to remove by the sound waves. The results of an open reactor inspection and product gel level are similar to those of Example 5.

Example 7 (comparative) is designed to check the influence of sound wave frequency. All the design and operating parameters are identical to those of Example 2, except the sound wave frequency is increased to 45 Hz. The results of open reactor inspection and product gel level are very similar to those of Examples 5 and 6. It is discovered that the high frequency sound waves are less effective in removal of the particle build-up.

Example 8 (comparative) is used to examine the effect of sonic tube configuration. All the design and operating parameters are identical to those of Example 2, except there are 5 elbows in each sonic tube. A weaker SSPL and a weaker minimum SPL in the freeboard are obtained. In addition, severe piping vibration is observed during the operation. Note, undesirable levels of piping vibration is usually to be avoided for safety reasons. Open reactor inspection shows a thin layer (¼ to ½ inch) of particle build-up found only in certain areas of the freeboard surface, and product gel level is better than that of Examples 5 through 7, but not as good as that achieved by Example 2. This result indicates the necessity to reduce the number of bends or elbows in the sonic pipe. The mechanism of sound energy loss at elbows is similar to the loss in small diameter sonic tube, plus the extra piping vibration due to the elbow-caused bounce-back pulsations in the opposite direction of the main pulsation.

Example 9 used different sonic nozzle locations, orientations, numbers and sonic tube insertions, though the other design and operating parameters were similar to those of Example 2. The upper part of the reactor dome was not covered by the most effective volume of any sonic nozzle (i.e., a cone-shaped volume with the conical node at a sonic nozzle). Open reactor inspection revealed particle build-up on the upper part of the dome section. A thin layer (about ⅛ to ¼ inch thick) of friable powder-like resin particle was found on most parts of the exterior sonic tube surfaces inserted into the reactor.

This example illustrated the importance of avoiding long tube insertion and the necessity of covering the entire surface to be cleaned by at least one cone-shaped effective volume of the sonic nozzle. Meanwhile, the product gel level was similar to that of Example 8. Another interesting observation made during the test was that the sound wave frequency measured at the reactor dome was several times higher than the original sound wave frequency applied into the reactor. This undesired high frequency can be regarded as the result of a weak direct coverage of the sound wave and an effective wave superposition due to the wave reflection by reactor surfaces.

For Examples 1 and 3 through 9, particle build-up samples were collected. Lab tests were conducted by spiking those build-up materials with the regular polymer resin product. The tests confirmed that those build-up materials cause the gel in the product.

Example 10 (Best Mode) illustrates application of the sonic cleaner in a gas phase fluidized bed reactor for EPDM rubber production. Carbon black particles are added intermittently to the reactor to keep the electrostatic activity level under control and to prevent the sticky polymer from agglomerating. Design and operating parameters of the sonic cleaners used in Example 10 are well within the optimum ranges. After a period of reactor operation, no particle build-up is found on the interior surfaces of the reactor freeboard portion.

Example 11 (comparative) repeats the reaction conditions of Example 10, except the fluidized bed-level is lowered to 20 feet, with a bigger freeboard volume to be protected by the sonic cleaner, and less sonic nozzles were employed. The high volume-to-nozzle ratio of this example results in a weaker sound wave protection. Particle build-up, including both the resin particles and carbon black particles, is found on several areas of the freeboard surface.

Example 12 (comparative) repeats the reaction conditions of Example 10, except the locations of sonic nozzles are not optimized. As the result, the top of the reactor is poorly covered by direct sound wave propagation, and particle build-up is found at the reactor dome.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| Product | PE | PE | PE | PE | PE | PE | PE | PE | PE | EPDM | EPDM | EPDM |
| Reactor conditions[a] | R-1 | R-1 | R-1 | R-1 | R-1 | R-1 | R-1 | R-1 | R-1 | R-2 | R-2 | R-2 |
| Bed-level, ft | 47.5 | 47.5 | 47.5 | 47.5 | 47.5 | 47.5 | 47.5 | 47.5 | 47.5 | 47.5 | 20 | 47.5 |
| Number of sonic nozzles | 0 | 4 | 4 | 4 | 4 | 4 | 4 | 4 | 2 | 4 | 2 | 3 |
| Volume-to-nozzle ratio (ft³/nozzle) | N/A | 2331 | 2331 | 2331 | 2331 | 2331 | 2331 | 2331 | 2331 | 2331 | 6985 | 3108 |
| Sonic nozzle locations[b] | N/A | L-1 | L-1 | L-1 | L-1 | L-1 | L-1 | L-1 | L-2 | L-1 | L-3 | L-4 |
| Sonic nozzle orientations[c] | N/A | O-1 | O-1 | O-1 | O-1 | O-1 | O-1 | O-1 | O-2 | O-1 | O-3 | O-4 |
| Sonic tube length (WL) | N/A | ¼ | 7/16 | ¼ | ¼ | ¼ | ¼ | ¼ | ¼ | ¼ | ¼ | ¼ |
| Sonic tube diameter (i.d., in.) | N/A | 4 | 4 | 1.5 | 4 | 4 | 4 | 4 | 4 | 4 | 4 | 4 |
| Standard SPL (dB)[d] | N/A | 150 | 118 | 122 | 150 | 150 | 150 | 138 | 150 | 148 | 148 | 148 |
| Minimum | N/A | 138 | 106 | 110 | 138 | 138 | 138 | 124 | 124 | 136 | 127 | 130 |

TABLE 1-continued

| Example | 1 | 2 | 3 | 4 | 5 | 6 | 7 | 8 | 9 | 10 | 11 | 12 |
|---|---|---|---|---|---|---|---|---|---|---|---|---|
| SPL in freeboard (dB) | | | | | | | | | | | | |
| Sound wave duration (sec) | N/A | 18 | 18 | 18 | 5 | 18 | 18 | 18 | 18 | 15 | 15 | 15 |
| Sound wave interval (minute) | N/A | 8 | 8 | 8 | 8 | 65 | 8 | 8 | 8 | 10 | 10 | 10 |
| Sound wave frequency (Hz) | N/A | 16.5 | 16.5 | 16.5 | 16.5 | 16.5 | 45 | 16.5 | 16.5 | 17 | 17 | 17 |
| Bends in every sonic tube | N/A | 1 | 1 | 1 | 1 | 1 | 1 | 5 | 1 | 1 | 1 | 1 |
| Sonic tube insertion length (ft) | N/A | 0 | 0 | 0 | 0 | 0 | 0 | 0 | 2.5 | 0 | 0 | 0 |
| Particle buildup (1 ~ 3 month operation) | most of FB | No | most of FB | most of FB | most of FB, thin | most of FB, thin | most of FB, thin | part of FB, thin | top of FB, thin | No | part of FB | top of FB |
| Product gel ranking[e] | 4 | 1 | 4 | 4 | 3 | 3 | 3 | 2 | 2 | N/A | N/A | N/A |

Notes:
[a]: see Table 2 for reactor condition codes R-1 and R-2
[b]: see Table 3 for sonic nozzle location codes L-1, L-2, L-3 and L-4
[c]: see Table 3 for sonic nozzle orientation codes O-1, O-2, O-3 and O-4
[d]: based on single sonic nozzle
[e]: 1 - the best (no gel), 5 - the worst
Abbreviations: PE - polyethylene, EPDM - ethylene/propylene/diene terpolymer WL - wave length (of sound waves), FB - Freeboard

TABLE 2

| Reactor condition code | R-1 | R-2 |
|---|---|---|
| Reactor temperature (° C.) | 107 | 45 |
| Reactor pressure (psig) | 300 | 400 |
| Catalyst type | chromium | vanadium |
| Superficial gas velocity (ft/sec) | 2.6 | 1.6 |
| Ethylene partial pressure (psi) | 200 | 80 |
| Hydrogen to ethylene molar ratio | 0.045 | 0.01 |
| 1-hexene to ethylene molar ratio | 0.0018 | N/A |
| Propylene partial pressure (psi) | N/A | 184 |
| Ethylidene-norbornene concentration (ppm) | N/A | 20–40 |
| Product density (g/cm$^3$) | about 0.953 | N/A |
| Product flow index (g/10 min.) | about 40 | N/A |

TABLE 3

| Sonic nozzle location & orientation codes | Sonic nozzle | Sonic nozzle elevation[a] (ft) | Sonic nozzle radial location[b] (ft) | Sonic nozzle azimuth[c] | Sonic nozzle orientation |
|---|---|---|---|---|---|
| L-1, O-1 | #1 | 65.9 | flush with wall | 0° | horizontal |
| | #2 | 75.5 | flush with wall | 90° | 20° from horizontal |
| | #3 | 65.9 | flush with wall | 180° | horizontal |
| | #4 | 75.5 | flush with wall | 270° | 20° from horizontal |
| L-2, O-2 | #1 | 76.9 | 7 | 0° | vertical, downward |
| | #2 | 76.9 | 7 | 0° | vertical, downward |
| L-3, O-3 | #1 | 65 | flush with wall | 0° | horizontal |
| | #2 | 65 | flush with wall | 180° | horizontal |
| L-4, O-4 | #1 | 51 | flush with wall | 0° | horizontal |
| | #2 | 51 | flush with wall | 120° | horizontal |
| | #3 | 51 | flush with wall | 240° | horizontal |

Notes:
[a] vertical distance from the distribution plate
[b] radial distance from the center of the reactor
[c] the azimuth of the #1 sonic nozzle is set as 0°

What is claimed is:

1. A process for polymerizing (a) at least one alpha olefin and optionally a diene or (b) one or more diolefins which process comprises: polymerizing in the presence of at least one polymerization catalyst in a gas phase reactor equipped with at least one sound wave producing device in which each device (1) emits sound waves ranging from about 5 Hz to 40 Hlz; (2) has a standard sound pressure level ranging from about 100 dB to 200 dB; (3) achieves a minimum sound pressure level on the interior reactor surface to be protected ranging from about 100 dB to 200 dB; and (4) wherein the sound waves are introduced into the reactor system via one or more sonic nozzles positioned such that each sonic nozzle has an elevation within about ±60% of the value and an azimuth within about ±60° of the value, calculated by the surface integration equation:

$$\oiint_{\text{surface to be protected}} W_f SPL\, dS = \text{maximum} \quad (1)$$

where $W_f$ is the weighting function ranging from about 1.0 to 5.0 for different parts of the interior surfaces of the reactor; SPL is the sound pressure level; dS is the surface element of the surface integration.

2. The process of claim 1 wherein 1 to 10 sound wave producing devices are placed into a reactor system in one or more locations selected from the group consisting of a freeboard portion of the reactor, one or more heat exchangers, a recycle line, below a distributor plate, a purge bin, and a baghouse.

3. The process of claim 1 wherein the sound wave producing device has (1) at least one pulsation generation unit, (2) at least one sonic tube connected with the pulsation generation unit, and (3) at least one sonic nozzle at the end of the sonic tube.

4. The process of claim 1 wherein interior surface of the reactor to be protected is covered by at least one cone-shaped volume with the conical node at a sonic nozzle and the conical angle smaller than about 270°.

5. The process of claim 3 wherein the sonic tube length ranges from about 1/8 to 3/8 times the sound wave length; and wherein the number of bends in each sonic tube is less than about 6.

6. The process of claim 3 wherein the inner diameter of the sonic tube ranges from about 2 to about 12 inches; and wherein the insertion length of each sonic tube into the reactor ranges from about flush to 6 feet.

7. The process of claim 1 wherein the ratio of reactor freeboard volume to sonic nozzle number is less than about 7,000 cubic feet per nozzle.

8. The process of claim 1 wherein the sound wave duration ranges from about 5 seconds to continuous operation and the sound wave interval ranges from about 0 to 4 hours.

9. The process of claim 1 wherein an inert particulate material selected from the group consisting of carbon black, silica, clay, talc, and mixtures thereof is employed.

10. The process of claim 1 wherein the polymer produced is selected from the group consisting of (a) homopolymers and copolymers of $C_2$–$C_{18}$ alpha olefins;
(b) ethylene-propylene-diene terpolymers;
(c) polybutadiene;
(d) polyisoprene;
(e) polychloroprene;
(f) polymers of isobutylene copolymerized with isoprene; and
(g) ethylene-butene rubbers and ethylen-butene-diene rubbers.

11. The process of claim 1 wherein the diolefin is butadiene and wherein said butadiene is polymerized with a monomer selected from the group consisting of styrene and acrylonitrile.

12. A process for polymerizing styrene which process comprises: polymerizing in the presence of at least one polymerization catalyst in the presence of an inert particulate material in a gas phase reactor equipped with at least one sound wave producing device in which each device (1) emits sound waves ranging from about 5 Hz to 40 Hz; (2) has a standard sound pressure level ranging from about 100 dB to 200 dB; (3) achieves a minimum sound pressure level on the interior reactor surface to be protected ranging from about 100 dB to 200 dB; and (4) wherein the sound waves are introduced into the reactor system via one or more sonic nozzles positioned such that each sonic nozzle has an elevation within about ±60% of the value and an azimuth within about ±60° of the value, calculated by the surface integration equation:

$$\oiint_{\text{surface to be protected}} W_f SPL\, dS = \text{maximum} \quad (1)$$

where $W_f$ is the weighting function ranging from about 1.0 to 5.0 for different parts of the interior surfaces of the reactor; SPL is the sound pressure level; dS is the surface element of the surface integration.

* * * * *